United States Patent
Month et al.

[15] 3,653,883
[45] Apr. 4, 1972

[54] METHOD OF FABRICATING A POROUS TUNGSTEN BODY FOR A DISPENSER CATHODE

[72] Inventors: Alfred Month; David Lawrence Thornburg, both of Lancaster, Pa.

[73] Assignee: RCA Corporation

[22] Filed: Apr. 1, 1970

[21] Appl. No.: 24,830

[52] U.S. Cl. ........................... 75/212, 75/.5 AB, 75/222
[51] Int. Cl. ............................................. B22f 1/00
[58] Field of Search .................. 75/222, .5 AB, 211, 212

[56] References Cited

UNITED STATES PATENTS 3,397,057   8/1968   Harrington et al. ................ 75/211

*Primary Examiner*—Carl D. Quarforth
*Assistant Examiner*—R. E. Schafer
*Attorney*—Glenn H. Bruestle

[57] ABSTRACT

A method comprising

A. dissolving tungsten trioxide or molybdenum trioxide in a solvent containing water and at least one of morpholine, ethylene diamine, tetraethylene pentamine, triethylene tetramine, triethanolamine, hexamethylene tetramine, and glycine to produce a solution, B. mixing tungsten metal powder with a quantity of said solution to provide in addition about 0.25 to 4.00 weight percent tungsten or molybdenum as a compound thereof in said mixture, C. pressing a quantity of said mixture into a pellet, D. and then heating said pressed pellet above about 2,000° C. to produce a porous tungsten body.

6 Claims, No Drawings

METHOD OF FABRICATING A POROUS TUNGSTEN BODY FOR A DISPENSER CATHODE

BACKGROUND OF THE INVENTION

This invention relates to a method of fabricating a porous tungsten body for use in a dispenser cathode.

A dispenser cathode, described for example in U. S. Pat. Nos. 2,700,000 to R. Levi et al and 3,201,639 to R. Levi, is comprised of a body of refractory metal having pores therein connecting the interior of the body with its surface. These pores are filled with an alkaline earth composition, for example a composition containing barium aluminate, which is electron emissive during its operation as a cathode. By one method of fabrication, the body of refractory material is prepared by pressing a quantity of finely-divided tungsten metal containing a small amount of stearic acid or other binder-filler into a pellet. Then, the pellet is heated at an elevated temperature, usually above 2,000° C, at which the particles sinter together and form a cohesive mass which is porous. During this heating the binder-filler is volatilized. Then, the sintered pellet is impregnated with the alkaline earth composition by heating at elevated temperatures with a suitable composition, whereby the impregnant melts and passes into the body. By previous processes, the heating steps caused the body to shrink and warp in such manner that close dimensional tolerances could not be maintained. It was therefore necessary to machine the pellet to the precise geometry required. Furthermore, the prior mixtures with tungsten metal powder were not free-flowing, or tended to ball, or produced mechanically weak pellets upon pressing.

SUMMARY OF THE INVENTION

The novel method of fabricating a porous tungsten body for a dispenser cathode comprises A. dissolving tungsten trioxide or molybdenum trioxide in a solvent containing water and at least one of morpholine, ethylene diamine, tetraethylene pentamine, triethylene tetramine, triethanolamine, hexamethylene tetramine, or glycine, B. mixing tungsten metal powder, preferably in the size range of 3 to 20 microns, with a quantity of said solution to provide 0.25 to 4.00 weight percent tungsten or molybdenum as a compound thereof in said mixture, C. pressing a quantity of said mixture into a pellet, D. and then heating said pressed pellet above about 2,000° C. to produce said porous tungsten body.

The above-described solution provides a combination binder-filler function to the pellet, providing mechanical strength to the unsintered pellet and also a means for controlling the porosity of the sintered pellet. This mixture also produces a mixture which is a free-flowing powder with substantially no balling of the material. This feature permits easier and better metering of the material which flows into the pressing die. Finally, by using the above-described solution, the pressed pellet exhibits less warpage during the heating steps, permitting close dimensional tolerances to be maintained.

DESCRIPTION OF THE PREFERRED EMBODIMENT

EXAMPLE

Part A — Preparation of the binder-filler solution — Weigh 23.19 grams tungsten trioxide powder into a 250-ml. beaker. Add 26.14 milliliters of morpholine and 50 milliliters of water to the beaker. Then, heat the mixture to about 80° to 90°C. with slow stirring for about 1 hour to allow the trioxide powder to dissolve in the water-morpholine solvent. Then, filter the solution through No. 40 Whatman paper into a 250-milliliter graduate. Add water to the 184-milliliter mark, and then transfer the solution to a clean stoppered bottle.

Part B — Preparation of the sintered pellet — Weigh 20.0 grams tungsten metal powder into a borosilicate glass mortar. The distribution of the particles is preferably such as to have a minimum of particles below 3 microns and a minimum of particles above 20 microns. Add 2.0 milliliters of the solution prepared under Part A into the powder and mix thoroughly. This introduces about 1.0 weight percent tungsten, as dissolved compound into the mixture. Place the mixture in an air oven and bake at about 40° to 50°C. for about 30 minutes. Then, grind mix the material and repeat the heating and grinding steps until the powder is dry and free flowing. Transfer the dried powder to a clean stoppered bottle. The use of a tungsten oxide-morpholine filler produces a powder mixture that is well adapted for pressing in that the powder flow rate is relatively high because the powder is free-flowing and there is no balling of the powder.

Place a sufficient quantity of the dried powder in a die and press it into a pellet. In this example the pellet is a truncated cone about 0.025-inch high with an extended cylinder about 0.060-inch diameter which extends 0.005 to 0.040 inch in height above the truncated portion. The pellet is then sintered at temperatures above about 2,000° C. during which the morpholine and other organics that may be present are volatilized, and the particles are sintered into a porous body. The body retains its shape with a normal amount of shrinkage but with substantially no warpage.

Part C — Impregnation of the sintered pellet — The porous tungsten pellet is then impregnated with alkaline earth material which is preferably presintered; that is, the oxides or compounds which decompose upon heating to oxide have been melted together previously, cooled and then reduced to a powder. The impregnant material is then placed in contact with the body. The material and pellet are heated rapidly in a strongly reducing atmosphere, such as cracked anhydrous ammonia or pure hydrogen, to a temperature at which a liquid phase is formed, usually about 1,700° C. or higher. The liquid phase passes into the pores of the pellet causing impregnation. Impregnation may be carried out also in a vacuum or a nonoxidizing inert atmosphere. Any excess material remaining on the surface of the body is removed after cooling to leave a clean surface of refractory metal. The impregnated pellet is ready for assembly into an electron tube.

GENERAL CONSIDERATIONS

We have found that refractory metal powder mixes made by a previous process which included the use of stearic acid as a binder lubricant do not produce smooth, free-flowing powders. We found it difficult to reproduce the amount of powder which flowed into the relatively small volume of the pressing die, which is, for example, about 0.070-inch diameter and about 0.030-inch high. In the novel method, tungsten trioxide dissolved in a solvent containing water and one of a group of organic materials is substituted for the stearic acid. After pressing, the remaining tungsten containing material acts both as a binder to hold the unsintered pellet together, and as a filler which aids in the densification of the pressed powder into a pellet.

The additive solution which substitutes for stearic acid is mixed with tungsten metal powder and dried to give a smooth, free-flowing, pressable powder. The novel method has the following advantages over previous methods which use other binders:

i. the spread in weights of pellets is lower, ii. the pressed pellets prior to sintering are less crumbly, and iii. densification of the pellet takes place more easily and more uniformly.

The binder-filler of the example is prepared by dissolving tungsten trioxide in morpholine (1:3 mole ratio by weight) dissolved in water to make a concentration of about 0.100 gram/milliliter of tungsten in solution. An aliquot of this prepared solution is mixed with tungsten metal powder, so that the solution added will provide about 0.25 to 4.00 weight percent tungsten as a compound thereof in solution in the tungsten metal powder mixture. We prefer an addition of about 1 weight percent tungsten in solution in the tungsten metal powder mixture. More than about 4 weight percent tungsten in solution in the tungsten metal powder mixture produces sintered bodies which were too porous for economical fabrication as cathodes. Less than about 0.25 weight percent tungsten in solution in the tungsten metal powder mixture produces pressing mixtures which do not flow readily into the pressing die.

The use of tungsten trioxide by itself in the pressing mixture did not give good pressing qualities. The use of water alone in the tungsten metal powder mixture aided pressing but the pressed unsintered pellets were too crumbly. The use of morpholine and water (without tungsten trioxide) in the tungsten metal powder produced a tacky pressing mixture which did not flow into the pressing die. However, the mixture of tungsten oxide with an organic compound such as morpholine in water produces a mixture which has a free-flowing quality which fills the pressing die easily, has good pressing qualities, produces mechanically strong unsintered pellets, and produces sintered pellets with the desired porosity and with a minimum of warpage.

We have found that molybdenum trioxide can be substituted for part or all of the tungsten trioxide. We have also found that morpholine may be replaced partly or entirely with one or more of the following organic bases: ethylene diamine, tetraethylene pentamine, triethylene tetramine, triethanolamine, hexamethylene tetramine, and glycine.

The steps of pressing the pellet and then sintering the pellet can be carried out by any of the prior-art procedures. In one procedure, the pellet may be presintered in a wet hydrogen atmosphere to help clean the pores of any carbonaceous material. The presintered pellet is then sintered in the usual way at temperatures above 2,000°C.

Impregnation of the porous sintered pellet may be carried out by any of the methods used in the prior art. We prefer to use a finely-divided corundum (aluminum oxide) to prepare the impregnant material in order to accelerate reaction of alumina with barium and calcium compounds. One preferred alumina is marketted by the Aluminum Company of America under the designation X–16. It is prepared by grinding a pure $Al_2O_3$ so that the mean particle size of the material is less than one micron. We also prefer to prepare impregnant material by heating the mixture in a wet hydrogen atmosphere up to 1,100°C. Then, the gas atmosphere is changed to a dry hydrogen atmosphere and the temperature raised further to about 1,400°C. where it is held for about 30 minutes and then cooled. Preferred impregnant materials are essentially combinations of barium, calcium and aluminum oxides wherein the mol ratios of BaO to $Al_2O_3$ to CaO are in the range of about 5/2/3 to 5/2/0.3. This material may be used directly or may be stored for periods up to at least a year. The powdered impregnant material is placed in a crucible in contact with the sintered porous pellet and heated in a strongly reducing atmosphere above about 1,700°C., whereby the impregnant material melts and fills the pores of the pellet.

We claim:

1. A method of fabricating a porous tungsten body for a dispenser cathode comprising
   A. dissolving tungsten trioxide or molybdenum trioxide in a solvent consisting essentially of water and at least one of morpholine, ethylene diamine, tetraethylene pentamine, triethylene tetramine, triethanolamine, hexamethylene tetramine, and glycine,
   B. (i) mixing tungsten metal powder with a quantity of said solution, said quantity to provide about 0.25 to 4.00 weight percent tungsten or molybdenum as a compound thereof in said mixture, and then (ii) drying said mixture,
   C. pressing a quantity of said dry mixture into a pellet,
   D. and then heating said pressed pellet above about 2,000° C. to produce said porous tungsten body.

2. The method defined in claim 1 wherein, in step (A), tungsten trioxide is dissolved in a solvent consisting essentially of water and ethylene diamine.

3. The method defined in claim 1 wherein, in step (A), molybdenum trioxide is dissolved in a solvent consisting essentially of water and morpholine.

4. The method defined in claim 1 wherein, in step (A), tungsten trioxide is dissolved in a solvent consisting essentially of water and morpholine.

5. The method defined in claim 4 wherein, in step (B), said mixture contains about 1 weight percent tungsten as compound thereof.

6. The method defined in claim 1 wherein, in step (B), the size of the tungsten powder particles is substantially entirely in the range of 3 to 20 microns.

* * * * *